US005393178A

United States Patent [19]

Daraz

[11] Patent Number: 5,393,178

[45] Date of Patent: Feb. 28, 1995

[54] ENGRAVING QUILL HOLDERS

[76] Inventor: Bruno Daraz, 469 High Ridge Rd., Stamford, Conn. 06905

[21] Appl. No.: 27,393

[22] Filed: Mar. 8, 1993

[51] Int. Cl.[6] .......... B23C 5/12

[52] U.S. Cl. .......... 409/234; 40/913; 407/54; 408/16

[58] Field of Search .......... 409/186, 210, 214, 218; 408/14, 16, 192, 202, 241 S; 279/126, 143, 907; 40/913; 407/54

[56] References Cited

U.S. PATENT DOCUMENTS

| | | | |
|---|---|---|---|
| 1,984,839 | 12/1934 | Murray | 408/226 X |
| 2,240,825 | 5/1941 | Alexander | 409/186 |
| 2,833,168 | 5/1958 | Nelson | 408/202 |
| 2,915,926 | 12/1959 | Woerner | 408/226 X |
| 3,143,900 | 8/1964 | Deckl et al. | 408/226 |
| 4,733,800 | 9/1988 | Furuhashi et al. | 409/234 |

*Primary Examiner*—Z. R. Bilinsky
*Attorney, Agent, or Firm*—F. Eugene Davis, IV

[57] ABSTRACT

A cut or slit is provided in the holder generally perpendicular to the actual opening through the holder in which the shaft of an engraving quill is held. The cut or slit completely intersects the opening and divides the cut portion into two sections of unequal thickness. Means are provided for opening or closing the slit to thereby engage and disengage the quill shaft. This means is provided by a pair of set screws; one in the portion of the holder above the slit and one in the portion of the holder below the slit. A polymer insert is provided for smoothly engaging the shaft of an engraving quill when the slit is forced open. It is on the opposite side of the opening from the set screws. Turning a set screw causes the thinner portion of the cut holder to bend locking an engraving quill shaft. An insert is provided on the opposite side of the holder from the screws to counter balance the holder and the hole for the insert is capped by a color coded plastic insert which may be used to identify the type of quill in the holder. Alternatively, the counter balance may be dispensed with and the polymer insert color coded and extended entirely through one side of the holder.

An engraving quill having a color coded dot at the end thereof opposite to the engraving tool mounted thereon is also disclosed for identifying the nature of the material to be engraved by the quill.

22 Claims, 3 Drawing Sheets

ENGRAVING QUILL HOLDERS

TECHNICAL FIELD

This invention relates to engraving quill holders, more particularly it relates to such holders for holding the shaft of an engraving quill utilized in a rotating engraving machine.

BACKGROUND ART

Engraving machines such as bench top pantographs and computer controlled engraving machines utilize engraving tools called engraving cutters and burnishers. These tools comprise an engraving quill having a long circular cylindrical shaft with a cutter or burnisher mounted at one end thereof.

These quills are provided with a holder or holding collar sometimes called a cutter knob which is threaded at the bottom end for securing it to the cutter spindle mechanism of the engraving machine. Prior art quill holders are provided with a set screw and are roughened or knurled over the outer surface so that they may be rotated around and moved up and down the shaft of the engraving quill to meet the requirements of various machines and various thicknesses of materials to be engraved. Thus, the shaft of the quill is moved in the holder until a correct position is reached and the set screw is then tightened. Unfortunately, during high torque engraving, especially with high speed machines, the set screw engagement of the shaft may not be sufficient to keep the shaft from rotating within the holder. Repeated tightening of the set screw to secure a better grip causes distortion of the quill holder so that it becomes eccentric about the quill shaft. This sets up a vibration in the spindle of the engraving machine.

When used during high spindle rotation, the single set screw often is not sufficient to hold the harden cutter shaft. Repeated tightening of the set screw produces excessive pressure that causes distortion of the cutter head bore which again sets up undesirable vibration.

In addition, repeated tightening of the set screw permanently distorts the shank, unless very high strength carbide is utilized. Low carbon steel shafts become permanently marred and it becomes difficult to set the set screw and the knob at the proper position. The shafts often rust permanently fixing the set screw and the holder or knob to the shaft.

Diamond tip quills or cutters are widely used with a soft steel shank. While these do not generally require rotation of the tool, they do require down feed pressure of the tool and again often the set screw point pressure is not sufficient to securely hold the tool in place. On the other hand, solid carbide quills require repeated retightening of the set screw because of the high spindle rotation and weight of the tool.

DISCLOSURE OF THE INVENTION

According to my invention, an improved engraving quill or engraving tool holder may be manufactured by taking an existing quill holder and cutting a slot in it perpendicular to the axial opening for the engraving quill shaft. The slot preferably intersects the entire quill opening.

At the outer end of the slot, I tap a screw threaded hole from the top to bottom of the upper extension of the tool holder. This tapped hole is parallel to the opening for the quill shaft. I placed two set screws therein—-one in the portion of the holder below the cut and one in the portion above the cut. These are utilized to open the cut when a tool is in the opening through the tool holder, thus frictionally, engaging the tool shaft. The cut is preferrably made so that the upper portion of the tool holder above the cut is much thinner than the portion below the cut so that only the upper portion significantly bends when the cut is spread apart preferably using the upper set screw.

On the opposite side of the axial opening from the cut, I bore out the existing screw threads for the set screw of the prior art holders and then place therein a polymer insert under great pressure. This polymer insert pressing against a quill shaft in the holder together with the distorted upper portion of the holder when the cut is opened by the set screws I provide for smooth engagement of the quill shaft; smoother than that which would be afforded if the polymer insert was not utilized.

According to my invention the polymer insert may be color coded to indicate the nature of the tool held in the quill holder. Additionally, I provide a dimple in the center of the top of the quill shaft in which I place a dot of colored paint to identify the nature of the quill.

In an alternative embodiment of the invention, I incorporate a dynamically balancing counter weight in the hole provided in the prior art tool holders for the set screw in addition to the polymer insert.

OBJECTS OF THE INVENTION

It is therefore an object of the invention to provide an improved engraving quill holder for an engraving machine.

Another object of the invention is to provide such a quill holder which securely engages shafts of various metals without permanently marring them.

A further object of the invention is to provide such a quill holder that securely engages such quill shafts and does not slip during use.

Still another object of the invention is to provide such a quill holder that may be smoothly slipped up and down and around the shaft for precise location thereon.

A still further object of the invention is to provide a tool holder that reduces spindle vibration.

Yet another object of the invention is to provide such a quill holder that is dynamically balanced.

A yet further object of the invention is to provide such a quill holder at low cost.

Yet still another object of the invention is to provide color coded identifications on engraving tools or quills and on engraving tool or quill holders.

Other objects of the invention will in part be obvious and will in part appear hereinafter.

The invention accordingly comprises articles of manufacture possessing the features of construction, elements, and arrangements of elements and parts which will be exemplified in the constructions and articles hereinafter set forth. The scope of the invention will be indicated in the claims.

BRIEF DESCRIPTION OF THE DRAWINGS

For a fuller understanding of the nature and objects of my invention, reference should be had to the following detailed description, taken in connection with the accompanying drawings, in which.

The same reference characters refer to the same elements throughout the several views of the drawings.

BEST MODE FOR CARRYING OUT THE INVENTION

Figure 1:
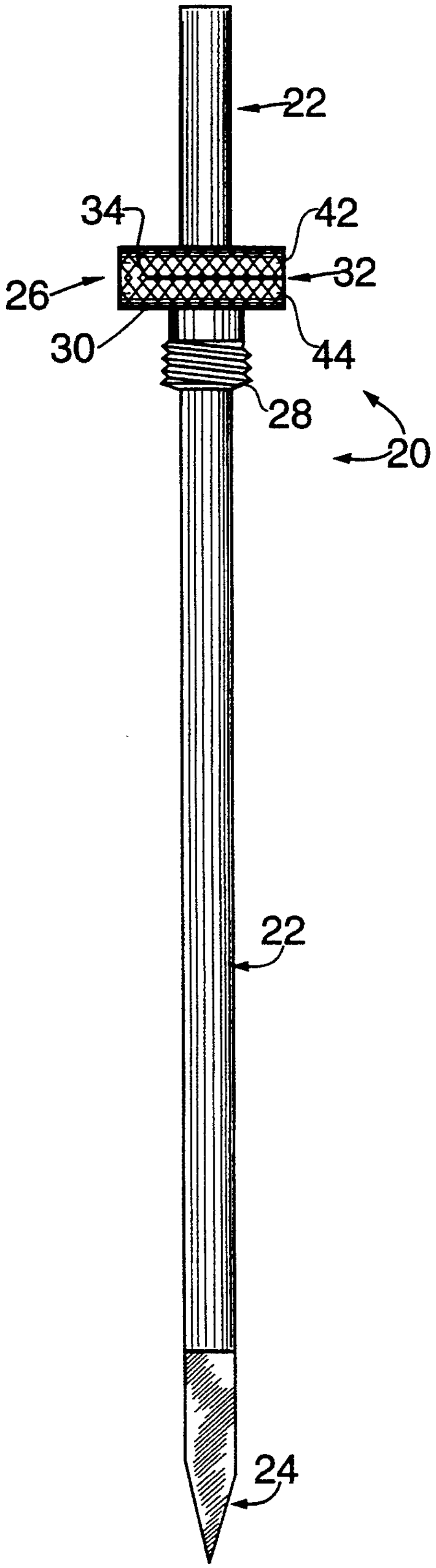
FIG. 1 is a front view of an engraving quill or tool and engraving quill holder according to my invention.
Figure 2:
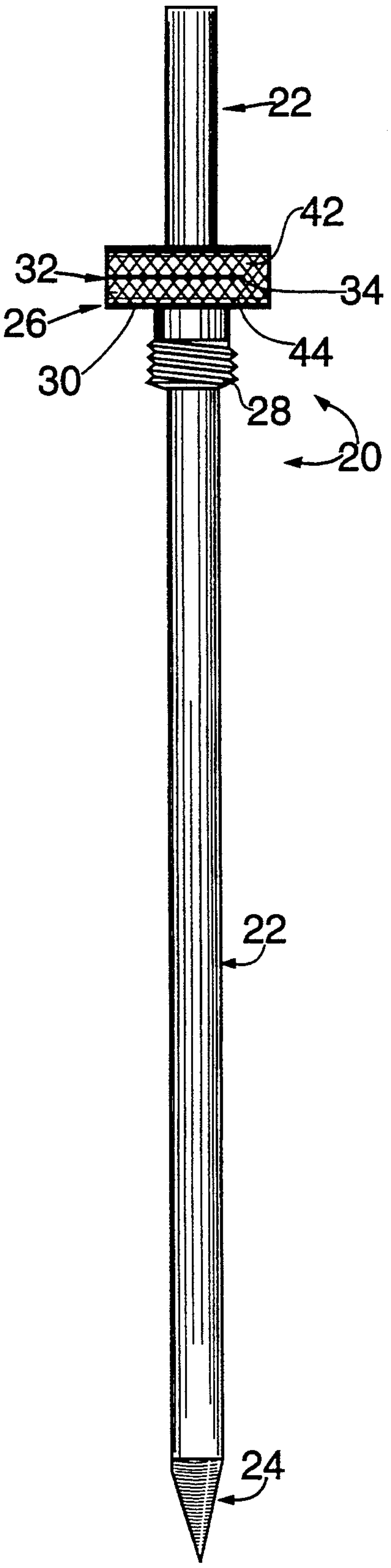
FIG. 2 is a back view of the engraving quill and holder of FIG. 1.

Now referring to FIGS. 1 through 4, an engraving tool, according to my invention, is generally shown at 20. It comprises a shank portion or shaft, generally indicated at 22, and a cutting or burnishing tip portion, generally indicated at 24.

The engraving tool 20 is held in a quill holder, according to my invention, generally indicated at 26. The quill holder 26 conventionally comprises a screw threaded portion 28 which screws in the spindle of the engraving machine and an enlarged diameter knob portion 30.

According to my invention, the knob portion 30 is provided with an open cut 32 from the right hand side shown in FIG. 1 to beyond the opening for the shank 22 as shown at 34.

Figure 3:
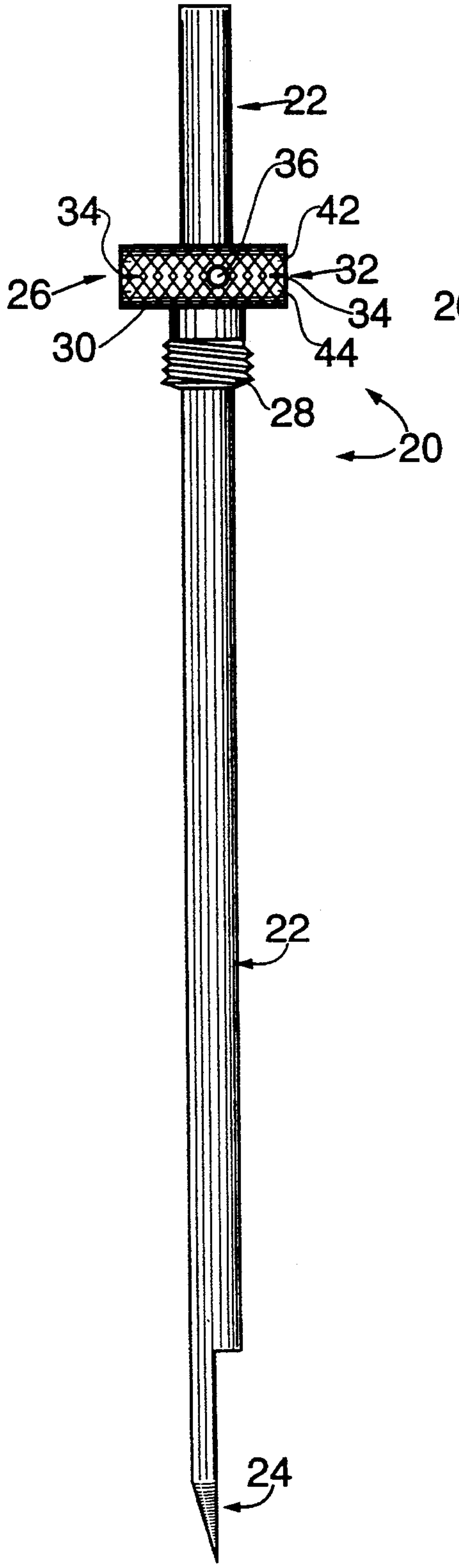
FIG. 3 is a side view of the engraving tool and holder of FIG. 1 taken from the left.
Figure 4:
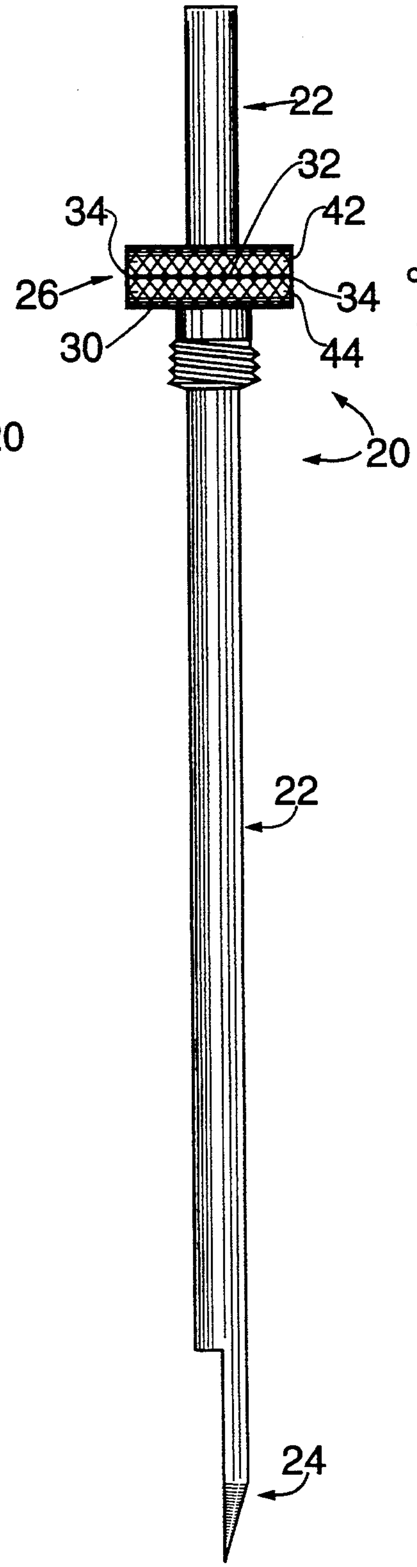
FIG. 4 is a side view of the engraving quill and holder of FIG. 1 taken from the right.

Now referring to FIG. 3, on the opposite side of the knob portion 30 from the opening of the cut 32, there can be seen the outer end of a polymer insert 36 which extends through a hole in the knob portion 30 all the way to the shank 22 of the engraving quill.

Figure 5:
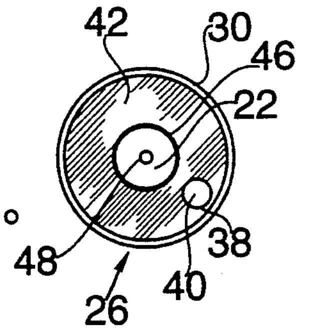
FIG. 5 is a top view of the engraving quill and holder of FIG. 1.
Figure 6:
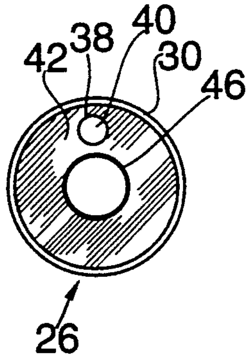
FIG. 6 is an enlarged top view of the engraving quill holder of FIG. 1.
Figure 7:
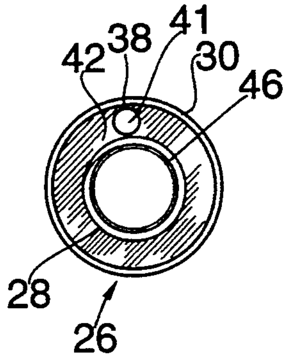
FIG. 7 is an enlarged bottom view of the engraving quill holder of FIG. 1.
Figure 10:
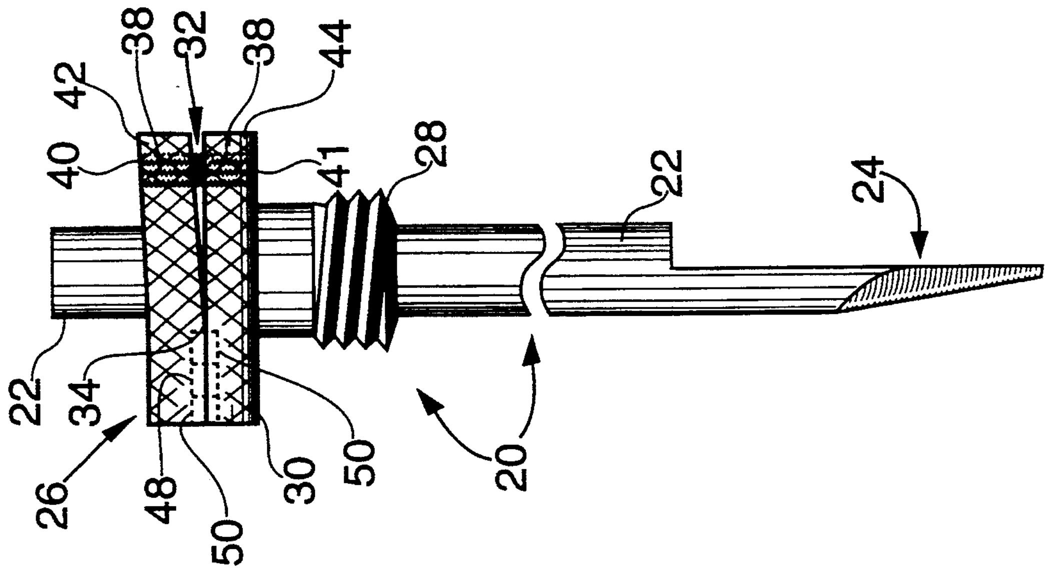
FIG. 10 is a diagrammatic view, partially in cross section, similar to FIG. 9 showing a modification of my invention.
Figure 9:
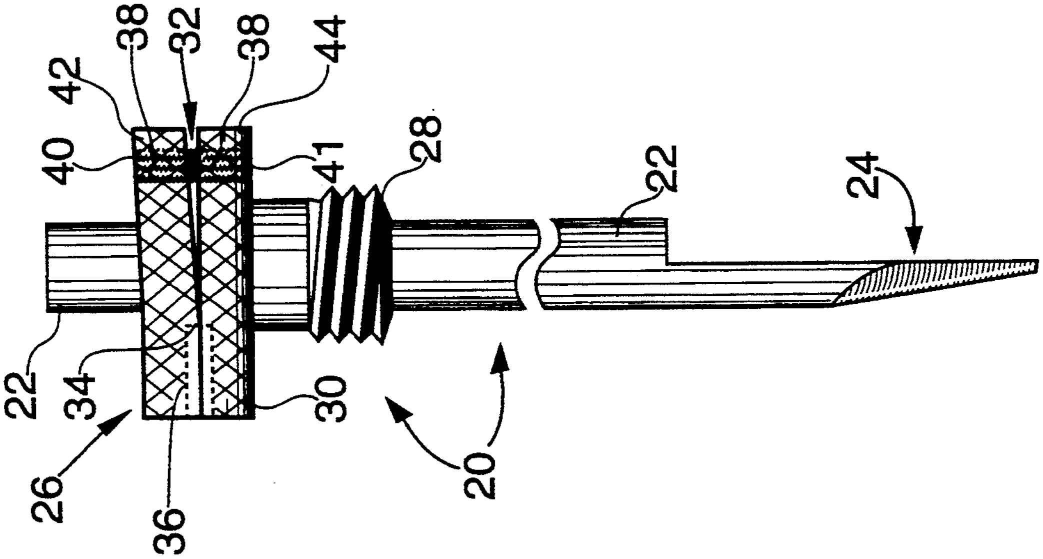
FIG. 9 is a diagrammatic view, partially in cross section, of the engraving quill and quill holder of FIG. 8 taken from the left.

Now referring to FIGS. 5, 6, and 7, according to my invention, I provide a tapped screw hole 38 through the knob portion 30 of the tool holder 26 which is parallel to the axis of the shank 22. I provide a pair of set screws therein: one set screw 40 in the top portion 42 of the quill holder above the cut 32 (see FIG. 1) and a second set screw 41 in the bottom portion 44 of the knob portion 30 below the cut 32 (see also FIG. 1). Thus, it will be seen that these set screws are parallel to the axial opening 46 in the quill holder 26 as best seen in FIG. 6.

According to my invention, I provide a paint drop 48 in a dimple in the end of the quill shaft 22 as best seen in FIG. 5 to identify the nature of the quill or the material which may be cut by the quill. Additionally, the insert 36 (FIG. 3) may be colored to also identify the nature of the quill or the material which may be cut by the quill.

Figure 8:
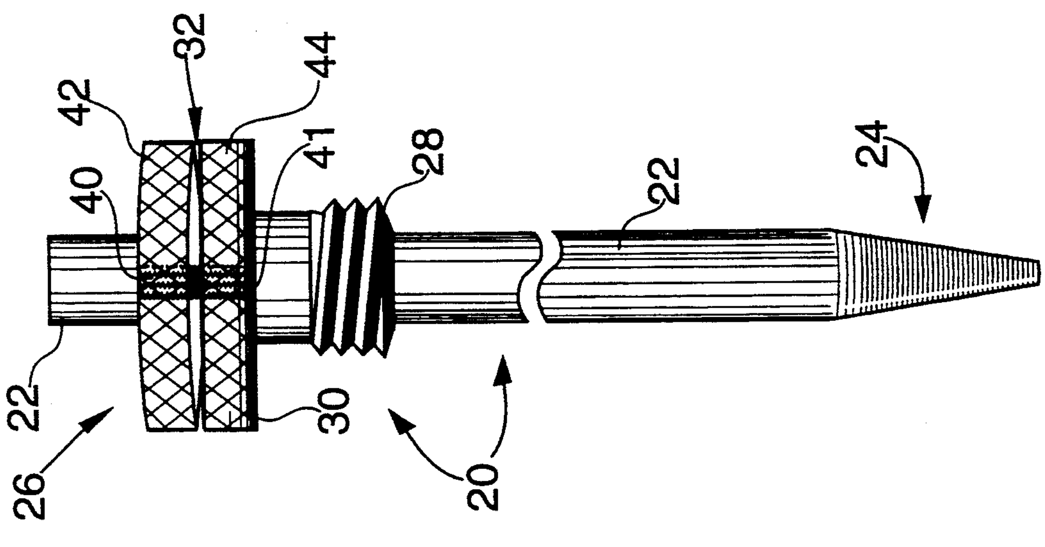
FIG. 8 is a diagrammatic view, partially in cross section, of the engraving quill and holder of FIG. 1.

In FIG. 8 I have shown that when the two set screws are turned in, the upper portion 42 of my quill holder bends upward. This engages the shaft 22 of the engraving quill and presses it against the polymer insert 36. I have found that when the polymer insert is used, a very smooth action may be obtained when the shaft 22 is only lightly engaged frictionally, so that it may be moved up and down and around the shaft 22 to the correct position. The upper set screw 40 may then be turned to further distort the upper portion 42 to tightly engage the shaft 22. If the upper and lower set screws 40 and 42 add execss weight to one side of the holder 26, I may provide a dynamic counter balancing metal weight as indicated at 48 in between polymer inserts 50.

Those skilled in the art will understand that the lower set screw 42 is not absolutely necessary, but provides a harden seat for the upper set screw 40 to work against, however, set screw could work directly against the lower portion 44 of the knob portion 30.

The improved engraving quill holder, according to my invention, may be conveniently made by taking a conventional engraving tool holder, milling the cut 32; drilling and tapping the tapped holes 38; drilling out the existing radial tapped hole to provide for the insert 36, engaging the set screws 40 and 42 and, inserting the polymer insert 36 which preferably may be an acrylic rod using a ram press when a shaft 22 is in the holder 26.

It will thus be seen that the objects set forth above among those made apparent from the preceding description, are efficiently attained, and since certain changes may be made in the above articles without departing from the scope of the invention, it is intended that all matter contained in the above description or shown in the accompanying drawings shall be interpreted as illustrative and not in a limiting sense.

Having described my invention what I claim as new and desire to secure by Letters Patent is:

1. In an engraving quill holder for an engraving machine having an axial opening therethrough for engaging an engraving quill, the improvement comprising:

A. a cut in said holder generally perpendicular to said axial opening through one side of said holder and intersecting said opening; and, B. means effective to change the dimension of said cut on said one side of said holder to thereby clamp or release an engraving quill in said axial opening.

2. The improvement defined in claim 1 wherein said cut is in a portion of said holder extending radially from said axial opening and said portion is divided by said cut into radial portions of unequal axial thickness.

3. The improvement defined in claim 2 and a solid polymer insert disposed on the other side of said axial opening from said means and adapted to frictionally engage a quill shaft disposed in said axial opening.

4. The improvement defined in claim 3 wherein said polymer insert extends radially to the outer edge of said holder.

5. The improvement defined in claim 4 wherein said polymer insert is color coded at the outer portion thereof.

6. The improvement defined in claim 2 wherein said polymer insert extends radially to the outer edge of said holder.

7. The improvement defined in claim 6 wherein said polymer insert is color coded at the outer portion thereof.

8. The improvement defined in claim 2 wherein said means comprises at least one screw in said quill holder generally perpendicular to said cut.

9. The improvement defined in claim 8 and an insert on the other side of said axial opening from said screw providing dynamic balance about said axial opening.

10. The improvement defined in claim 2 wherein said means comprises a pair of axially alligned screws in said quill holder generally perpendicular to said cut.

11. The improvement defined in claim 2 wherein said cut intersects said axial opening from one side thereof to the opposite side thereof.

12. The improvement defined in claim 1 wherein said means comprises at least one screw in said quill holder generally perpendicular to said cut.

13. The improvement defined in claim 1 and an insert on the other side of said axial opening from said means providing dynamic balance about said axial opening.

14. The improvement defined in claim 1 wherein said means comprises a pair of axially alligned screws in said quill holder generally perpendicular to said cut.

15. The improvement defined in claim 4 and an insert on the other side of said axial opening from said screws providing dynamic balance about said axial opening.

16. The improvement defined in claim 1 wherein said cut intersects said axial opening from one side thereof to the opposite side thereof.

17. An engraving quill holder for an engraving machine comprising:

A. a unitary metal piece;
B. an axial right circular cylindrical opening in said piece for receiving an engraving quill;
C. a threaded portion coaxial with said opening;
D. a knurled portion coaxial with said opening;
E. a generally planar cut in said knurled portion generally perpendicular to said opening passing completely through said opening and dividing said knurled portion into radial portions of unequal thickness;
F. at least one screw in said knurled portion generally perpendicular to said cut for changing the thickness of said cut at said screw; and
G. a solid polymer insert disposed on the other side of said axial opening from said means and adapted to frictionally engage a quill shaft disposed in said axial opening.

18. The improvement defined in claim 17 comprising two aligned screws in said knurled portion generally perpendicular to said cut, one of said screws in the knurled portion below said cut, the other in the knurled portion above said cut, the ends of said screws in contact.

19. The improvement defined in claim 18 and a counter balance in said knurled portion opposite to said screws for dynamic balance.

20. The improvement defined in claim 17 wherein said polymer insert extends radially to the outer edge of said holder.

21. An engraving quill comprising:

A. an elongated shaft;
B. an engraving tool mounted to one end of said shaft; and
C. a color coded dot on the other end of said shaft identifying the nature of the material which may be engraved using the quill.

22. The quill defined in claim 21 wherein said shaft is a right circular cylinder and said dot is located on the axis of said cylinder.

* * * * *